Patented July 13, 1926.

1,591,958

UNITED STATES PATENT OFFICE.

FLORENTIN BIDAUD, OF RHONE, FRANCE, ASSIGNOR TO SOCIETE CHIMIQUE DES USINES DU RHONE, OF PARIS, FRANCE, A CORPORATION OF FRANCE.

PROCESS OF PRODUCING ARSENATE OF LIME.

No Drawing. Application filed January 15, 1926. Serial No. 81,591.

It is known that calcium arsenite when heated in an oxidizing atmosphere is transformed into calcium arsenate. This operation is usually carried on in an appropriate furnace where the arsenite is heated, either indirectly through the walls of the furnace or directly by contact with oxidizing gases of high temperature.

The present invention is based on the observation that it is not necessary, for this reaction, to utilize exterior heat, as is the case in all the processes heretofore known, but that the heat generated in the materials is sufficient to bring about the oxidation.

By selecting a suitable method of procedure, the arsenite can be oxidized by the use of cold oxidizing gases, it being sufficient merely to induce the reaction by preliminarily carrying the mass to the oxidizing temperature. Owing to this extremely economical method of oxidizing, the technical possibilities of this process are numerous. A single example, without limitation, is given below:

The calcium arsenite is charged into a vertical furnace which has been carefully thermally insulated. The reaction is then induced by bringing a part of the charge to the oxidizing temperature, say approximately 450° C., any suitable means being employed for this purpose.

From this moment all exterior heating becomes useless and is therefore discontinued. It is sufficient to cause a current of cold oxidizing gases to pass through the mass. The oxidation automatically continues by means of the heat generated, up to the complete transformation of the arsenite into arsenate.

One can oxidize in a furnace such as that referred to, an unlimited quantity of arsenite carrying off by suitable means the arsenate formed at the lower part and charging in proportion the corresponding quantities of arsenite at the upper part, which can be done continuously or intermittently.

It is very important to be able to regulate the operation of the furnace. If the temperature falls, the reaction will be arrested; if, on the contrary, the temperature is too high the quality of the final product is impaired. The regulation of the temperature may be accomplished by any of the following means.

By employing gas more or less rich in oxygen. Pure oxygen, or a mixture of oxygen and air, or pure air, or, a mixture of air and neutral gases, may be used for this purpose.

By using arsenite in a more or less humid condition, whereby the water in evaporating will absorb more or less of the heat of the reaction.

The more or less humid calcium arsenite may be mixed, either with calcium arsenate already formed, or with slaked lime, or with limestone. The dehydration of the slaked lime or the decarbonation of the limestone will absorb a part of the heat of reaction. One may obtain by these two last means an arsenate mixture of lime, but that is unimportant, because the product generally used in agriculture is always diluted with lime.

It is understood that all these means of regulation may be used alone or simultaneously depending on the combinations desired.

Having thus described my invention, what I claim is:

1. A process of producing calcium arsenate in a continuous way, which consists in charging in a continuous way calcium arsenite into a furnace, heating a part of the starting charge to the oxidizing temperature, discontinuing the heating as soon as the reaction commences and causing a current of oxidizing gases to pass through the progressing mass, and regulating the temperature to an amount necessary and sufficient for a complete oxidation.

2. In the process of producing calcium arsenate in a continuous way, by oxidizing calcium arsenite, the heating being discontinued as soon as the reaction commences, regulating the temperature produced by the reaction by insulating thermally the furnace and by introducing in the furnace heat absorbing substances.

3. In the process of producing calcium arsenate in a continuous way, by oxidizing calcium arsenite, the heating being discontinued as soon as the reaction commences, regulating the temperature produced by the reaction by adding to the arsenite a compound of lime able to give quick lime at the oxidation temperature of the arsenite.

4. In the process of producing calcium arsenate in a continuous way, by oxidizing calcium arsenite, the heating being discontinued as soon as the reaction commences, regulating the temperature produced by the reaction by adding to the arsenite carbonate of lime.

In testimony whereof I have signed my name to this specification.

FLORENTIN BIDAUD.